United States Patent [19]

Solvi

[11] Patent Number: 4,940,005
[45] Date of Patent: Jul. 10, 1990

[54] DEVICE FOR INJECTING PREHEATED AIR INTO A SHAFT FURNACE

[75] Inventor: Marc Solvi, Ehlange/Mess, Luxembourg

[73] Assignee: Paul Wurth S.A., Luxembourg, Luxembourg

[21] Appl. No.: 357,552

[22] Filed: May 25, 1989

[30] Foreign Application Priority Data

May 25, 1988 [LU] Luxembourg .............................. 87226

[51] Int. Cl.$^5$ ............................ F23L 5/00; F23L 1/00
[52] U.S. Cl. .................................... 110/182.5; 432/99; 122/6.6
[58] Field of Search .................... 432/99, 222, 223, 77; 122/1 A, 6.6; 110/254, 182.5, 184, 264, 265

[56] References Cited

U.S. PATENT DOCUMENTS

| 3,766,868 | 10/1973 | Mahr | 122/6.6 X |
| 3,972,704 | 8/1976 | Loxley et al. | 432/77 X |
| 4,574,711 | 3/1986 | Christian | 110/254 X |

Primary Examiner—Henry A. Bennet
Assistant Examiner—Christopher B. Kilner
Attorney, Agent, or Firm—Fishman, Dionne & Cantor

[57] ABSTRACT

The device is composed of several tubular elements equipped with an inner refractory lining and connected, on one side, to the wall of the furnace by means of a downpipe, an elbow, a tuyere and a nozzle and, on the other side, to a main circular pipeline arranged round the furnace and fed with preheated air. Cooling coils are embedded in the mass of refractory lining and are fed with cooling air circulating through the coils in the same direction as the preheated air. The outlet of the coils opens into the inner conduit conveying the preheated air.

5 Claims, 2 Drawing Sheets

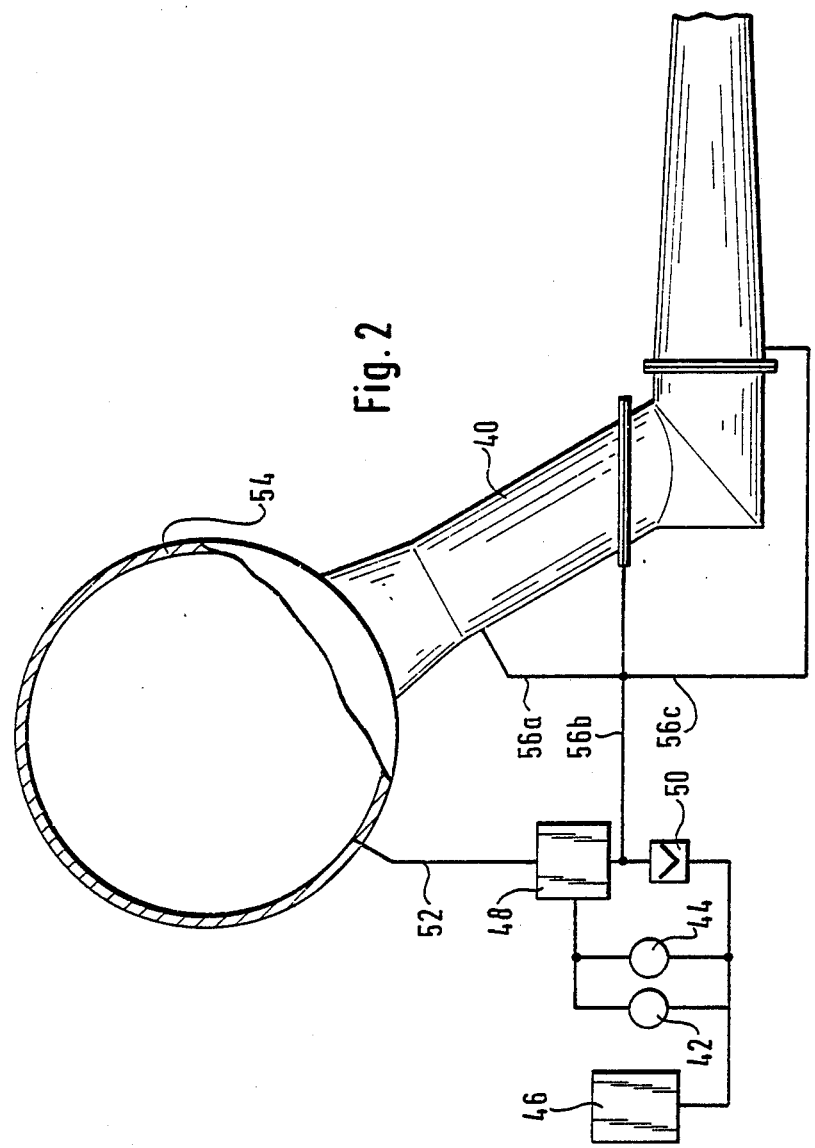

DEVICE FOR INJECTING PREHEATED AIR INTO A SHAFT FURNACE

TECHNICAL FIELD

This invention pertains to the transmission of heated fluids, and more particularly to devices for delivering heated air into a furnace.

BACKGROUND

The present invention relates to a device for injecting preheated air into a shaft furnace, composed of several tubular elements equipped with an inner refractory lining and connected, on one side, to the wall of the furnace by means of an elbow, a tuyere and a nozzle and, on the other side, to a main circular pipeline arranged round the furnace and fed with preheated air by means of a system comprising a blower, several Cowper stove and a mixing chamber.

A device of this type, known more generally as a "blastpipe holder" is known from U.S. Pat. No. 3,766,868. In certain high temperature furnaces, blastpipe holders are arranged in a relatively high number round the base of the furnace, for example a blast furnace, for the purpose of injecting hot air into it in order to maintain the combustion and reduction process in the furnace. To this end, the air is injected at a temperature of the order of 1,200° C. or above, and the heating to this temperature is carried out in air heaters currently called "Cowper stoves". A device of this type is shown in U.S. Pat. No. 3,766,868, the disclosure of which is incorporated herein by reference.

Because of this high temperature of the air passing through the blastpipe holders, conventional blastpipe holders have a thick inner refractory lining, on the one hand to prevent heat losses and on the other hand to protect the outer metal casing against thermal radiation and the high temperature of the air. Unfortunately, the great thickness of this refractory lining has an adverse influence on the production cost of the blastpipe holders and, furthermore, increases the weight and overall size of these. Despite some attempts, it has not been possible hitherto to provide a more advantageous alternative.

SUMMARY OF THE INVENTION

The object of the present invention is to provide a new blastpipe holder, of which the refractory lining, whilst having an at least equal performance, is less thick than those of the known blastpipe holders.

A device for injecting preheated air into a furnace is disclosed. The device has a central conduit for directing a stream of preheated air in a flow direction. The central conduit is defined by a refractory lined downpipe, elbow and tuyere. The device of the present invention includes a cooling coil embedded in the refractory lining. The cooling coil is provided for circulating cooling air through the refractory lining in the flow direction. The cooling coil has an outlet for discharging the cooling air into the central conduit.

BRIEF DESCRIPTION OF THE DRAWINGS

Other particular features and characteristics will emerge from the description of an advantageous embodiment given below as an illustration, with reference to the accompanying drawings in which:

FIG. 2 shows a block diagram illustrating the feeding of the cooling coils of the blastpipe holder.

DETAILED DESCRIPTION OF THE INVENTION

Figure 1:
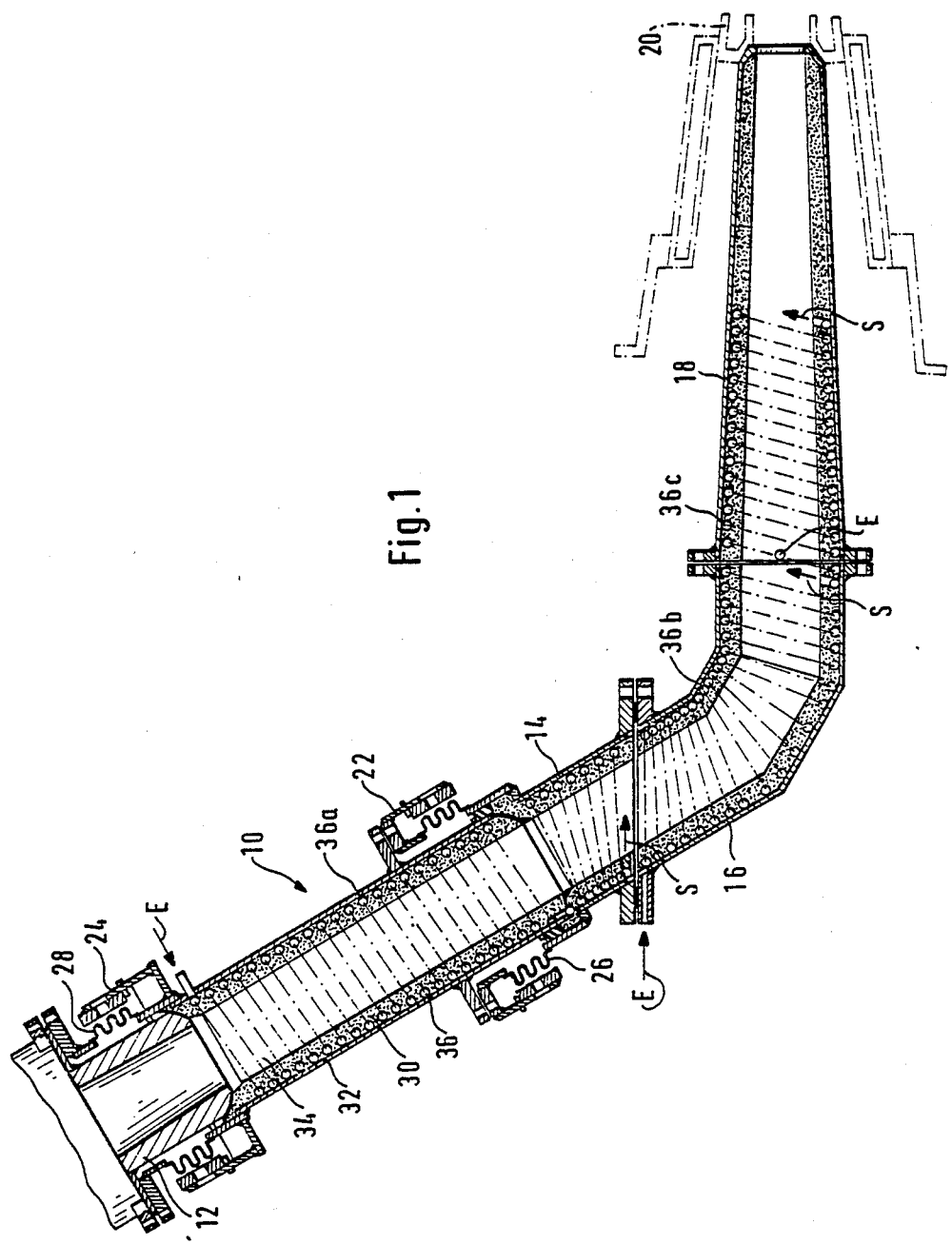
FIG. 1 shows a diagrammatic vertical section through a blastpipe holder according to the present invention.

The blastpipe holder illustrated in FIG. 1 comprises a downpipe 10, the upper end of which is articulated on a pipe connection 12 flanged to the circular pipeline (not shown) and the lower end of which is articulated on a pipe connection 14 flanged to the upper end of an elbow 16, the opposite end of which is fastened to a tuyere 18. The top of this tuyere 18 communicates via a ball-and-socket joint with a nozzle, by means of which the preheated air is injected into the furnace (not shown). The joints on either side of the downpipe 10 can take the form of cardan couplings 22, 24 associated with concertina-type compensators 26, 28 for ensuring the sealing.

All the elements of the blastpipe holder have an inner refractory lining 30 which is laid onto the inner surface of an outer metal casing 32. This refractory lining 30 therefore defines the conduit 34 via which the preheated air passes through the blastpipe holder. This refractory lining 30 has the two fold function of preventing heat losses from the preheated air passing through the conduit 34 and of protecting the metal casing 32 against excessive temperatures.

According to the present invention, there is a cooling of the refractory lining 30 by means of coils 36 which are embedded in the mass of the lining 30 in the immediate vicinity of the casing 32. The function of protecting and insulating the casing 32, performed in the known blastpipe holders by the refractory lining, is therefore at least partly performed, in the device according to the present invention, by the coils 36, so that the thickness of the refractory lining 30 can be reduced considerably, because the insulation formed by the coils is continuously regenerated as a result of the circulation of the air.

The coils 36 can consist of copper tubes of an inside diameter of 1 to 2 cm.

To ensure efficient cooling, the cooling circuit preferably consists of several independent sections, in this particular case, three sections; the first section 36a extending in the straight section of the blastpipe holder; the second section 36b extending in the elbow; and the third section 36c extending in the tuyere 18. Each of the cooling sections 36a, 36b, 36c has an inlet E and an outlet S for the cooling fluid which thus circulates in the direction of flow of the preheated air through the conduit 34. According to an advantageous embodiment, the cooling agent used is cold air coming from the preheated-air generation system, this cooling air being mixed, in the blastpipe holder, with the preheated air in order to adjust the temperature. Consequently, all the outlets S of the three cooling sections are directed into the conduit 34.

The feeding of the three cooling circuits of a blastpipe holder 40 is illustrated diagrammatically in FIG. 2. The references 42 and 44 denote a battery of Cowper stoves, in which the cold air coming from a blower 46 is heated to the required temperature in a way known per se. It should be noted that the notion "cold air" is entirely relative, because the "cold" air is already at a temperature of the order of 100° C. as a result of heating in the blower 46. Because the air is injected into the furnace at a specific temperature as constant as possible and of the order of 1,200°, the preheated air leaving the Cowper stoves 42 and 44 must be at a higher temperature. Furthermore, it is not possible to generate air at a constant temperature in the Cowper stoves 42, 44 and an arrangement is therefore made to generate air at a higher temperature in the Cowper stoves, in order to adjust the temperature to the required value as a result of controlled mixing with cold air in a mixing station 48. This cold air is conveyed into the mixing station 48 directly by the blower 46 under the control of an automatic valve 50 which sets the flow of air as a function of the temperature of the preheated air entering the mixing station 48. The preheated air is then conveyed from the mixing station 48 at a constant temperature through a pipeline 52 towards the circular pipeline 54 feeding the blastpipe holders 40.

The present invention proposes to use at least some of the cold air intended for the mixing chamber 48 in order to feed the cooling circuits of the blastpipe holder 40. The three cooling circuits are therefore connected via pipes 56a, 56b, 56c to the cold-air pipeline entering the mixing chamber 48 between the latter and the automatic valve 50. In other words, the adjustment of the temperature of the preheated air as a result of the controlled addition of cold air takes place partly in the mixing chamber 48 and partly inside the blastpipe holders 40. Consequently, the cooling of the blastpipe holders 40 does not disturb the temperature of the preheated air and does not make additional blowers necessary. There could even be the possibility of omitting the mixing chamber 48 comletely, so as to convey all the cold air for adjusting the temperature of the preheated air into the cooling circuits of the blastpipe holders 40 and thus carry out the adjustment of the temperature completely inside the blastpipe holders.

While preferred embodiments have been shown and described, various modifications and substitutions may be made theretor without departing from the spirit and scope of the invention. Accordingly, it is to be understood that the present invention has been described by way of illustrations and not limitation.

What is claimed is:

1. A device for injecting preheated air from an air supply into a shaft furnace, having a central conduit means for directing a stream of preheated air in a flow direction, said central conduit means being defined by a refractory lined downpipe, elbow and tuyere, wherein the improvement comprises a cooling coil means embedded in the refractory lining for circulating cooling air through the refractory lining in the flow direction, said cooling coil having an outlet for discharging the cooling air into the central conduit means.

2. The device of claim 1, wherein the cooling coil means comprises separate cooling coils are embedded in the refractory lining of the downpipe, of the elbow and of the tuyere.

3. The device of claim 2, wherein each cooling coil has a separate opening means for discharging cooling air into the central conduit means.

4. The device of claim 2, wherein the coils comprise copper tubes.

5. A device according to claim 1, wherein the device further comprises blower means for providing cold air to adjust the temperature of the preheated air and for providing cooling air to the cooling coil means in the refractory lining.

* * * * *